(12) United States Patent
Burns

(10) Patent No.: US 10,941,564 B2
(45) Date of Patent: Mar. 9, 2021

(54) CONTROL TUBE BEARING ASSEMBLY

(71) Applicant: Donald Ray Burns, Meridian, ID (US)

(72) Inventor: Donald Ray Burns, Meridian, ID (US)

( * ) Notice: Subject to any disclaimer, the term of this patent is extended or adjusted under 35 U.S.C. 154(b) by 0 days.

(21) Appl. No.: 16/247,287

(22) Filed: Jan. 14, 2019

(65) Prior Publication Data

US 2019/0226203 A1 Jul. 25, 2019

Related U.S. Application Data

(60) Provisional application No. 62/621,329, filed on Jan. 24, 2018.

(51) Int. Cl.

| | |
|---|---|
| *E04B 1/76* | (2006.01) |
| *E04C 1/39* | (2006.01) |
| *E04F 13/08* | (2006.01) |
| *E04F 21/02* | (2006.01) |
| *F16C 35/06* | (2006.01) |
| *F16D 1/06* | (2006.01) |
| *F16C 35/063* | (2006.01) |
| *F16D 1/08* | (2006.01) |
| *E04B 2/02* | (2006.01) |

(52) U.S. Cl.
CPC ............ *E04B 1/7633* (2013.01); *E04C 1/397* (2013.01); *E04F 13/0835* (2013.01); *E04F 21/026* (2013.01); *F16C 35/063* (2013.01); *F16D 1/0847* (2013.01); *F16D 1/0852* (2013.01); *E04B 2002/0213* (2013.01); *E04B 2002/0226* (2013.01); *F16C 2226/60* (2013.01)

(58) Field of Classification Search
CPC .... E04C 1/397; E04F 13/0835; E04F 21/026; E04F 21/1657; B65H 35/0053; E04B 2002/0213; E04B 2002/0226; F16D 1/0852; F16D 1/0847; F16C 35/063; F16C 35/07; F16C 23/02; F16C 2226/60

USPC ............ 384/35, 37, 42, 129, 247, 541, 583; 403/8, 19, 362, 366, 373; 425/168; 156/176, 179, 577

See application file for complete search history.

(56) References Cited

U.S. PATENT DOCUMENTS

| | | | | |
|---|---|---|---|---|
| 2,815,142 A | * | 12/1957 | Ames | E04F 21/026 156/526 |
| 3,259,943 A | * | 7/1966 | Kovach | B29C 45/1747 425/449 |
| 3,463,520 A | * | 8/1969 | Turro | F16D 1/0847 403/362 |
| 3,740,085 A | * | 6/1973 | Evans | F16D 1/0847 403/362 |
| 4,240,689 A | * | 12/1980 | Kooi | G02B 27/32 356/247 |
| 5,279,700 A | | 1/1994 | Retti | |
| 5,603,966 A | * | 2/1997 | Morris | B29C 49/58 425/168 |

(Continued)

*Primary Examiner* — Marcus Charles
(74) *Attorney, Agent, or Firm* — Schacht Law Office, Inc.; Dwayne Rogge

(57) ABSTRACT

Disclosed herein is a control tube bearing assembly comprising in one example a main body having an outer surface, a longitudinal axis, a radial axis; and an actuator sleeve radially exterior of the main body longitudinally repositionable thereto. The actuator sleeve in use is grasped by a user and repositioned relative to the main body so as to actuate tape dispensing, mastic dispensing, creasing components, and/or tape cutting components or a taper as desired.

8 Claims, 2 Drawing Sheets

(56) References Cited

U.S. PATENT DOCUMENTS

| | | | | |
|---|---|---|---|---|
| 6,092,956 | A * | 7/2000 | Swinley | F16C 35/063 |
| | | | | 384/541 |
| 6,874,557 | B2 * | 4/2005 | Jungklaus | E04F 21/165 |
| | | | | 156/577 |
| 7,624,782 | B2 * | 12/2009 | Jungklaus | B65H 35/0053 |
| | | | | 156/575 |
| 9,133,631 | B2 | 9/2015 | Jungklaus et al. | |
| D768,447 | S | 10/2016 | Jungklaus | |
| 2004/0244916 | A1 * | 12/2004 | Hall | E04F 21/165 |
| | | | | 156/574 |
| 2007/0044923 | A1 | 3/2007 | Jungklaus et al. | |
| 2015/0367377 | A1 * | 12/2015 | Negri | C09J 5/00 |
| | | | | 427/207.1 |

\* cited by examiner

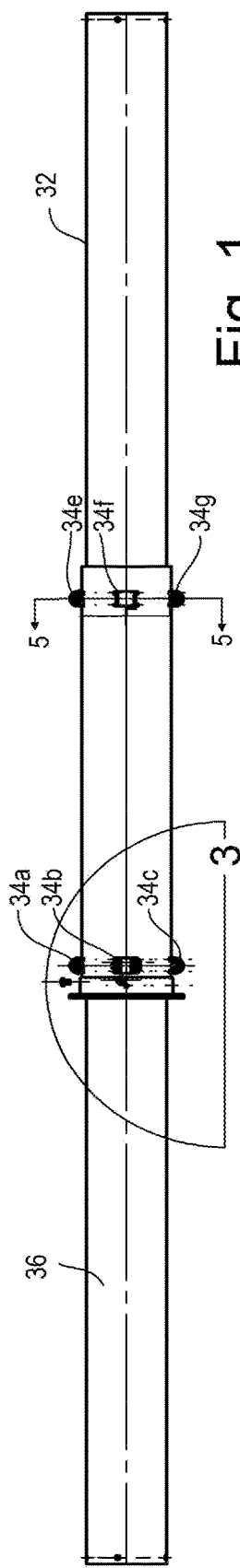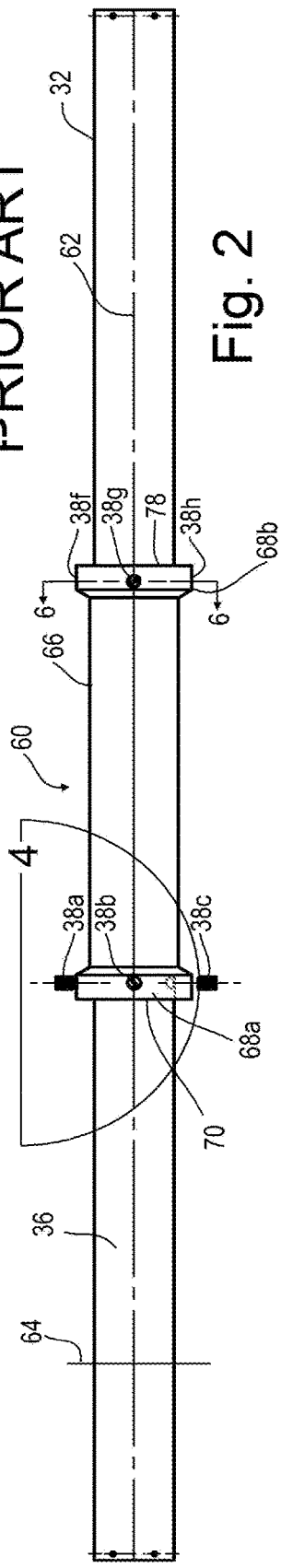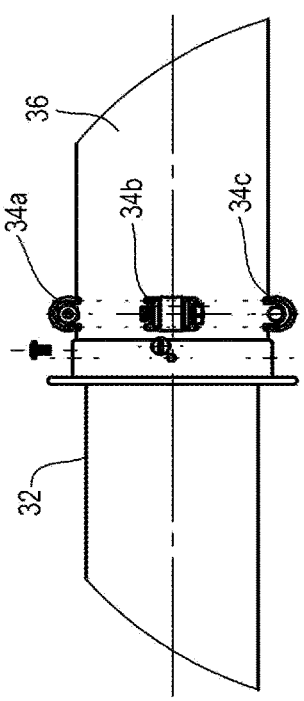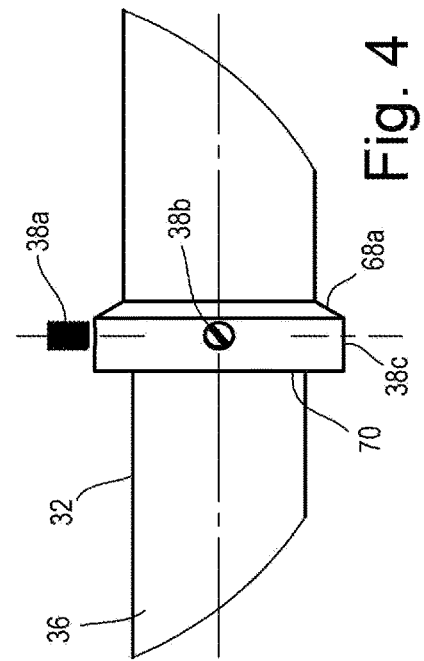

CONTROL TUBE BEARING ASSEMBLY

RELATED APPLICATIONS

This application claims priority benefit of U.S. Ser. No. 62/621,329 filed on Jan. 24, 2018, incorporated herein by reference.

BACKGROUND OF THE DISCLOSURE

Field of the Disclosure

This disclosure relates to the field of sliding bearing assemblies for actuator sleeves for taper tools and, more particularly, to sliding bearing assemblies for actuator sleeve components of taper tools that automatically and simultaneously advance tape and apply mastic to the tape.

BRIEF SUMMARY OF THE DISCLOSURE

Disclosed herein is a control tube bearing assembly for use in one example with a taper tool. The control tube bearing assembly comprising in one example a longitudinal axis, a radial axis, and an actuator sleeve radially exterior of a main body longitudinally repositionable thereto. The actuator sleeve in use is grasped by a user and repositioned relative to the main body so as to actuate tape dispensing, mastic dispensing, creasing components, and/or tape cutting components as desired.

The control tube bearing assembly in one example further comprising a first end collar attached to the actuator sleeve near a first longitudinal end of the actuator sleeve. The first end collar is radially exterior of the actuator sleeve may be attached thereto. Also disclosed is at least one first end adjustable sliding bearing threaded through a threaded surface defining a void though the first end collar. In this way, rotation of the adjustable sliding bearing relative to the collar results in linear (radial) repositioning of the adjustable sliding bearing towards or away from the main body. The at least one first end adjustable sliding bearing having an end surface in contact with the outer surface of the main body to slide there along.

The control tube bearing assembly in one example further comprising a second end collar attached to the actuator sleeve near a second longitudinal end of the actuator sleeve. The second end collar of one example is radially exterior of the actuator sleeve and in contact therewith. In one example the radially inner surface of the second end collar is in contact with the outer surface of the main body. The at least one second end adjustable sliding bearing threaded through a threaded surface defining a void though the second end collar. The at least one second end adjustable sliding bearing having and end surface in contact with the outer surface of the main body to slide there along. In one example, rotation of the least one first end adjustable sliding bearing and the at least one second end adjustable sliding bearing within the associated threaded void radially prepositions said adjustable sliding bearing relative to the outer surface of the main body.

The control tube bearing assembly may be arranged wherein at least two first end adjustable sliding bearings are threaded through threaded surfaces defining voids though the first end collar; the at least two first end adjustable sliding bearings each having and end surface in contact with the outer surface of the main body to slide there along.

The control tube bearing assembly may be arranged with at least three first end adjustable sliding bearings threaded through threaded surfaces defining voids though the first end collar; the at least three first end adjustable sliding bearings each having and end surface in contact with the outer surface of the main body to slide there along.

The control tube bearing assembly may further comprise at least two second end adjustable sliding bearings. These adjustable sliding bearings are threaded through threaded surfaces defining voids though the second end collar; the at least two first end adjustable sliding bearings each having an end surface in contact with the outer surface of the main body to slide there along.

The control tube bearing assembly may further comprise at least three first end adjustable sliding bearings. These adjustable sliding bearings are threaded through threaded surfaces defining voids though the first end collar. The at least two first end adjustable sliding bearings each having an end surface in contact with the outer surface of the main body to slide there along.

The control tube bearing assembly may be arranged wherein each of the at least one adjustable sliding bearings has a malleable material on a radially inward end thereof in contact with the outer surface of the main body.

The control tube bearing assembly may be arranged wherein each of the adjustable sliding bearings has a male threaded outer surface. Each of the first end collar and second end collar in one example comprises a plurality of female threaded voids, each configured to each accept one adjustable sliding bearing. In one example, rotation of each of the adjustable sliding bearings within the associated threaded void radially prepositions said each of the adjustable sliding bearings relative to the outer surface of the main body.

BRIEF DESCRIPTION OF THE SEVERAL VIEWS OF THE DRAWINGS

FIG. 1 is a top view of a prior art control tube assembly using roller wheels.

FIG. 2 is a top view of one example of the disclosed control tube bearing assembly.

FIG. 3 is an enlarged view of the region 3 of FIG. 1.

FIG. 4 is an enlarged view of the region 4 of FIG. 2.

DETAILED DESCRIPTION OF THE DISCLOSURE

In the construction fields, particularly in the field of interior finishing, walls, ceilings, and other surfaces are commonly formed with covering of a plurality of gypsum board sections or other panel materials. A wall joint (seam) is formed where two panels meet. Such a joint commonly forming a visual flaw in the otherwise smooth surface of the wall, ceiling, etc. In order to provide a smooth, continuous appearance, filler material and/or a bridging material is commonly applied to the wall joint to close or cover the seam and provide a smooth appearance. Mud (mastic) or other adhesive/filler and tape are typically applied to wall joints forming a filler and bridge. Mud and tape fillers are commonly applied by hand using a trowel, or with devices commonly referred to as taper tools.

Figure 8:
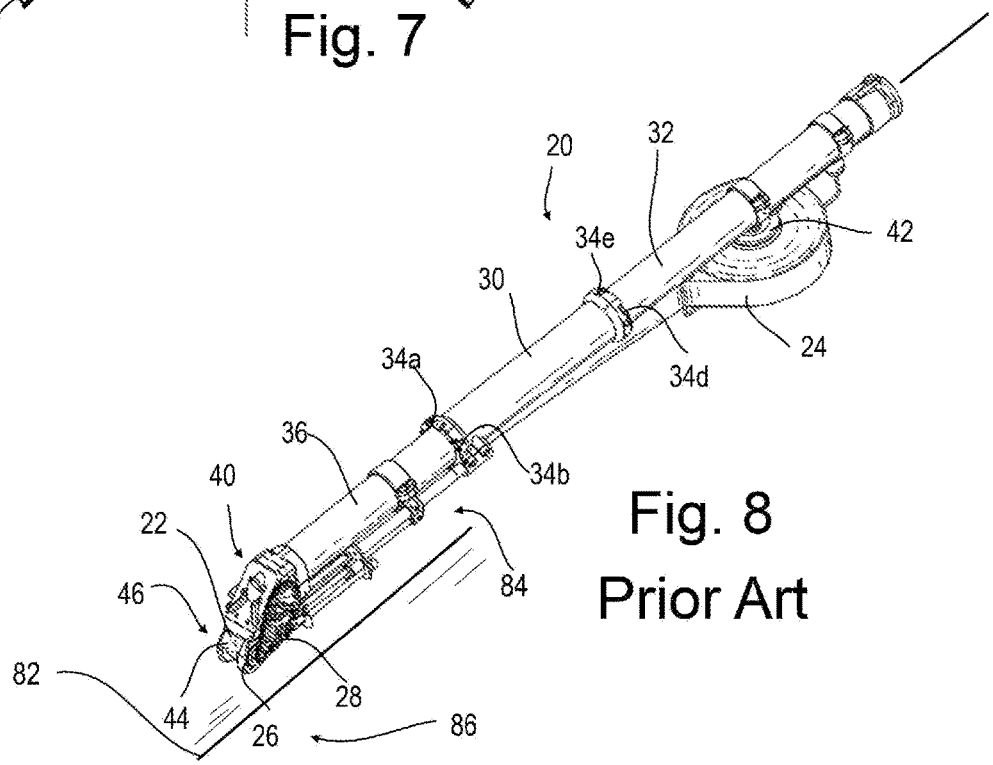
FIG. 8 is a perspective view of a prior art taper tool.

Taper tools 20 such as shown in FIG. 8 are commonly used for this purpose and generally apply an adhesive (mud) 22 to the tape 24 and subsequently apply the adhesive 22 and tape 24 to a wall joint. One such taper tool is disclosed in U.S. patent application Ser. No. 11/213,049 ('049) incorporated herein by reference. Another is disclosed in U.S. design Pat. D768,447 ('447) also incorporated herein by reference.

The adhesive/filler 22 used in such finishing processes is often referred to as mud, or mastic. The terms "mud" and "mastic" used herein defined as: construction adhesive commonly used to bond ceiling, wall, and floor tiles, plywood panels, concrete, asphalt, leather and fabric; waterproof, putty-like paste used in building as a joint-sealer or filler; deformation resistant, durable surfacing material. For ease in description, the term "mud" will be used in this disclosure to encompass both materials and equivalents. A variety of taper tools 20 exist in the market place with various configurations and methods of operation. Most taper tools 20 operate in a similar manner to that disclosed in the '049 and '447 disclosures.

A taper tool 20 is used to apply the tape 24 and mud 22 to a wall joint 82 between adjacent panels 84/86 as shown in FIG. 8. In use, the tape 24 exits the tool 20 from a first or forward end 26. In use taping a wall joint, after the taper tool reaches the top or bottom of the joint (depending on which direction the operator is applying the tape and mud) and completes tape application for the particular wall joint, the operator may activate a cutting mechanism 28 by repositioning an actuator sleeve 30 connected to the cutting mechanism 28 used to cut the tape 24. Typically, the cutting mechanism 28 is disposed on the main body 32 and behind the forward end 26 of the taper tool 20 and allowed to move linearly along the long axis 88 of the tool 20 via rollers 34.

After use, generally the taper tool 20 needs to be cleaned to remove substantially all mud. Mud 22 is exceptionally sticky by design and when hardened it is often difficult to remove from taper tools 20 and other surfaces. Several components of the taper tool 20 require periodic cleaning, and cleaning is often difficult. Cleaning of mud 22 from the exterior of the taping tool 20 is especially difficult where rollers 34(a-d) are used as rollers have small moving parts (rollers, axles, bearings, roller surfaces) connected to the actuator sleeve 30 to which the mud 22 attaches and adheres.

Figure 5:
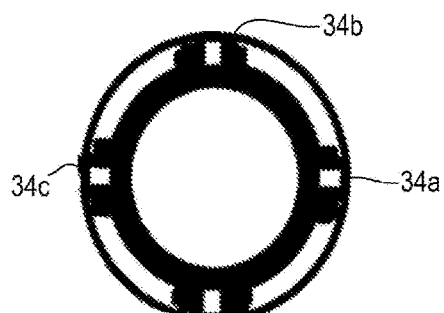
FIG. 5 is a cross sectional view taken along line 5-5 of FIG. 1.
Figure 7:
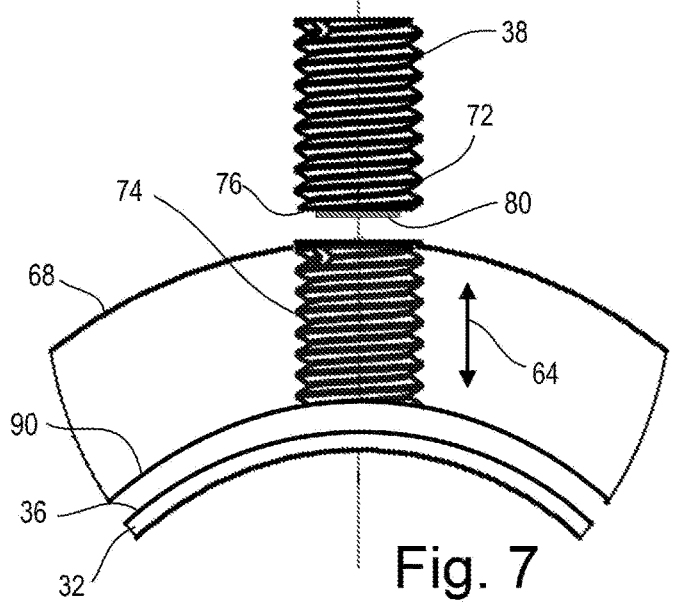
FIG. 7 is an enlarged view of the region 7 of FIG. 6.
Figure 6:
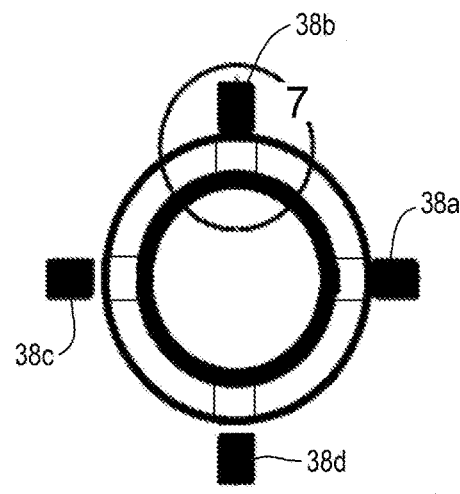
FIG. 6 is a cross sectional view taken along line 6-6 of FIG. 2.

The rollers 34 of prior art devices are configured to roll against the outer surface 36 of the main body 32 of the taper tool 20 with linkages attached thereto to control the dispensing of mud 22, dispensing of tape 24, and/or cutting of the tape 24. Mud 22 often mixed with other adhesives/ contaminates dries or cures on the taper tool 20 and interferes with operation of the rollers. The problem was identified by the inventor and a solution to this problem was discovered that by removal of the rollers 34 and replacing the rollers 34 with sliding components 38(a-i) as shown in FIGS. 4, 6, and 7; operation of the improved tool and cleaning of the improved tool were enhanced. Sliding components 38 in some applications are better suited to conform to an irregular surface and not be interfered with by mud or other contaminates.

In addition, due in part to the caustic and/or abrasive nature of mud, the rollers wear the outer surface of the main body 32 of the taper tool 20, often necessitating replacement.

In use, the rollers 34 have been found to injure operators. Users often place their hands against the rollers, at the end of the sleeve 30 or radially outward of the rollers 34 and as the rollers rotate, the rollers 34 catch the user's skin, fingers, clothing etc., which are then forced between the roller 34 and the sleeve 34 or main body 32. This often resulting in bruising, and tearing of skin, significantly injuring the operator.

In one example shown in FIG. 8, the taper tool 20 is provided with a container 40 for holding a supply of mud 22, a tape holder 42 for supporting a spool of tape 24, and a drive roller. The tape 24 extending from the spool of tape to the first end 26 where it is dispensed from the taper tool 20. The actuator sleeve 30 is supported by and moveable along the main body 32 as previously described. A tape advancing assembly is also provided, coupled to the actuator sleeve 30 and engageable with the tape 24 to advance the tape 24 toward the drive roller 44, and a mud application assembly 46 coupled to the actuator sleeve 30 and operable to apply mud 22 to the tape 24, wherein movement of the actuator sleeve 30 in one example advances the tape 24 toward the drive roller and applies mud to the advancing tape.

Disclosed herein is an improved control tube bearing assembly 60 shown attached to a taper tool 20 comprising in the example shown in FIG. 2 a main body 32 having an outer surface 36. The taper tool 20 may be in several different configurations, the novel component disclosed herein is the control tube bearing assembly 60. In the example shown the main body 32 of the control tube bearing assembly 60 is substantially cylindrical. In other examples the main body 32 is other shapes and extrusions of other shapes.

The control tube bearing assembly 60 in one example also comprises a longitudinal axis 62, with a radial axis 64 orthogonal to the longitudinal axis; with an actuator sleeve 66 radially exterior of the main body 32 and longitudinally repositionable thereto. In the example shown the actuator sleeve 66 is substantially cylindrical, although it could be other shapes and extrusions of other shapes. In use, the actuator sleeve 66 is grasped by a user and repositioned (longitudinally and/or circumferentially about the longitudinal axis 62) relative to the main body 32 so as to actuate tape dispensing, mastic dispensing, creasing components, and/or tape cutting components as desired.

As previously mentioned, mud 22 present and drying/ curing about the rollers 34 and other moving components of prior art devices often results in binding of the rollers 34, wear on the main tube, and potentially injury to operators. In addition, variances in the diameter tolerances and irregularities in the outer surface 36 of the main body 32 often result in less than smooth movement of the actuator sleeve 30 along the outer surface 36 of the main body 32 when rollers are used.

To overcome these and other issues, disclosed herein is a control tube bearing assembly 60 which among its improvements utilizes radially adjustable sliding components 38 instead of rolling components 34.

The control tube bearing assembly 60 in one example further comprises a first end collar 68a which may be attached to the actuator sleeve 66 near a first longitudinal end 70 of the actuator sleeve 30. The first end collar 68a in one example is attached to the first longitudinal end 70 and may be radially exterior of the actuator sleeve 66. The collar 68a providing a secure attachment location for the sliding components 38. The collar 68a also forming an easily identifiable end of the actuator sleeve 66 both visually and by touch, in that the collar 68a extends radially outward of the actuator sleeve 30 and thus an operators hand sliding longitudinally down the sleeve contacts the collar 68a. Also disclosed is at least one first end sliding bearing or sliding component 38 (a-d) attached to the first end collar 70. In one example, at least one first end sliding bearing is configured so as to be radially repositionable relative to the outer surface of the sleeve 66. This radial repositioning allows each adjustable sliding bearing 38 to be adjusted radially relative to the outer surface 36 of the main body 32. Radial adjustment allows the control tube bearing assembly 60 to achieve a desired contact/compression/tension for each unique application and adjustment for personal preference and use thereof.

In one example shown in FIG. 7, one or more adjustable sliding bearings 38 comprises a male threaded component 72 fitted into a female threaded void 74 in the collar 68. In this way, rotation of the adjustable sliding bearing 38 relative to the collar 68 results in linear (radial 64) repositioning of the adjustable sliding bearing 38 towards or away from the outer surface 36 of the main body 32 depending on the direction of rotation.

Each first end adjustable sliding bearing 38 of one example has an end surface 76 in contact with the outer surface 36 of the main body to slide there along longitudinally/circumferentially. In one example the end surface 76 may be attached to the male threaded component 72 or attached thereto.

The control tube bearing assembly 60 in one example further comprising a second end collar 68b also attached to the actuator sleeve, near a second longitudinal end 78 of the actuator sleeve 66. In one example the second end collar 68b is identical to the first end collar 68a, reversed and attached to the opposing longitudinal end of the sleeve 66.

The second end collar 68b in one example may be attached to the longitudinal end of the actuator sleeve 66 and/or may be attached to the radially exterior surface of the actuator sleeve 66. In one example the radially inner surface 90 of the second end collar 68b is immediately adjacent to or in contact with and conforms to (parallels) the outer surface 36 of the main body 32. The second end adjustable sliding bearing 38 may be threaded through a threaded surface defining a void 74 though the second end collar 68b similar to that disclosed above relative to FIG. 7. The at least one second end adjustable sliding bearing 38 in one example having an end surface 76 which contacts the outer surface of the main body 32 continuously or intermittently to slide there along. In one example, rotation of any of the adjustable sliding bearings 38 within the associated threaded void 74 radially 64 prepositions said adjustable sliding bearing 38 relative to the outer surface 36 of the main body 32. Commonly it has been found that the outer surface 36 of the main body 32 is not a smooth surface, having depressions and raised portions, thus having adjustable sliding components results the unexpected result that of an overall smoother operation than the rollers which were expected to have a smoother operation than sliding components.

The control tube bearing assembly may be arranged wherein at least two first end adjustable sliding bearings 38 are attached to the first end collar 68a. As such; the first end adjustable sliding bearings each have an end surface 76 in contact with the outer surface of the main body to slide there along. By providing two or more adjustable sliding bearings at or near the same longitudinal position along the actuator sleeve 30, the actuator sleeve 30 may be more securely mounted to slide along the main body 32 with less unwanted relative movement in non-circumferential, non-longitudinal directions.

In one example as shown in FIG. 7, a malleable or friction reducing material 80 may be affixed to the end surface 76 of each bearing 38. Materials such as Delrin® Nylon, PTFE, UHMWPE, polytetrafluoroethene (PTFE), acetyl, and other materials known for their performance as sliding bearings may be affixed to, or otherwise fitted into the end surface 76 in contact with the surface 36 of the main body 32.

The control tube bearing assembly 60 may be arranged with at least three first end 70 adjustable sliding bearings 38 are threaded through threaded surfaces defining voids 74 in the first end collar 68a; the at least three first end adjustable sliding bearings 38 each having and end surface 76 in contact with the outer surface 36 of the main body 32 to slide there along.

The control tube bearing assembly 60 may further comprise at least two second end adjustable sliding bearings 38. These adjustable sliding bearings 38 may be threaded through threaded surfaces defining voids 74 though the second end collar 68b; the at least two first end adjustable sliding bearings 38 each having an end surface 76 in contact with the outer surface 36 of the main body 32 to slide there along.

The control tube bearing assembly 60 may further comprise at least three first end adjustable sliding bearings 38. These adjustable sliding bearings 38 may be threaded through threaded surfaces defining voids 74 though the first end collar 68a. The at least two first end adjustable sliding bearings 38 each having an end surface 74 in contact with the outer surface 36 of the main body 32 to slide there along.

The control tube bearing assembly 60 may be arranged wherein each of the at least one adjustable sliding bearings 38 has a malleable or friction reducing material 80 on a radially inward end 76 thereof in contact with the outer surface 36 of the main body 32. Materials such as Delrin® Nylon, PTFE, UHMWPE, polytetrafluoroethene (PTFE), acetyl, and other materials known for their performance as sliding bearings may be affixed to, or otherwise fitted into the end surface 76 in contact with the surface 36 of the main body 32.

The control tube bearing assembly 60 may be arranged wherein each of the adjustable sliding bearings 38 has a male threaded outer surface 72. Each of the first end collar 68a and second end collar 68b in one example comprises a plurality of female threaded voids 74, each female threaded void 74 configured to accept one adjustable sliding bearing 38. In one example, rotation of each of the adjustable sliding bearings 38 within the associated threaded void 74 radially 64 prepositions said each of the adjustable sliding bearings 38 relative to the outer surface 36 of the main body.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A control tube bearing assembly comprising:
   a main body comprising an outer surface, a longitudinal axis, a radial axis orthogonal to the longitudinal axis;
   an actuator sleeve radially exterior of the main body, longitudinally repositionable along the main body;
   a first end collar at a first longitudinal end of the actuator sleeve;
   the first end collar extending radially exterior of the actuator sleeve;

at least one first end radially adjustable sliding bearing attached to the first end collar; the at least one first end adjustable sliding bearing having an end surface in contact with the outer surface of the main body to slide there along;

a second end collar at a second longitudinal end of the actuator sleeve longitudinally opposed to the first end collar;

the second end collar extending radially exterior of the actuator sleeve;

at least one second end adjustable sliding bearing attached to the second end collar; the at least one second end adjustable sliding bearing having an end surface in contact with the outer surface of the main body to slide there along;

each of the first end and second end adjustable sliding bearings comprising a male threaded outer surface;

each of the first end collar and second end collar comprises female threaded void configured to each accept one adjustable sliding bearing;

each of the adjustable sliding bearings comprising a friction reducing material on a radially inward end thereof, the friction reducing material in contact with the outer surface of the main body;

each of the first end collar and second end collar comprises at least one female threaded void configured to each accept one adjustable sliding bearing; and wherein rotation of each of the adjustable sliding bearings within the associated threaded void radially prepositions said adjustable sliding bearing relative to the outer surface of the main body.

2. A control tube bearing assembly comprising:

a main body having an outer surface, a longitudinal axis, a radial axis;

an actuator sleeve radially exterior of the main body, longitudinally repositionable thereto;

a first end collar near a first longitudinal end of the actuator sleeve, radially exterior of the actuator sleeve;

at least one first end radially adjustable sliding bearing attached to the first end collar; the at least one first end adjustable sliding bearing having an end surface in contact with the outer surface of the main body to slide there along;

a second end collar near a second longitudinal end of the actuator sleeve, radially exterior of the actuator sleeve;

at least one second end adjustable sliding bearing attached to the second end collar; the at least one second end adjustable sliding bearing having an end surface in contact with the outer surface of the main body to slide there along; and wherein the least one first end adjustable sliding bearing and the at least one second end radially adjustable sliding bearing are radially repositionable relative to the outer surface of the main body.

3. The control tube bearing assembly as recited in claim 2 further comprising:

at least two first end adjustable sliding bearings circumferentially spaced around the first end collar, attached to the first end collar; and the at least two first end adjustable sliding bearings each having an end surface in contact with the outer surface of the main body to slide there along.

4. The control tube bearing assembly as recited in claim 3 further comprising:

at least three first end adjustable sliding bearings circumferentially spaced around the first end collar, attached to the first end collar; and the at least three first end adjustable sliding bearings each having an end surface in contact with the outer surface of the main body to slide there along.

5. The control tube bearing assembly as recited in claim 2 further comprising:

at least two second end adjustable sliding bearings circumferentially spaced around the second end collar, attached to the second end collar; and the at least two first end adjustable sliding bearings each having an end surface in contact with the outer surface of the main body to slide there along.

6. The control tube bearing assembly as recited in claim 3 further comprising:

at least three first end adjustable sliding bearings circumferentially spaced around the first end collar, attached to the second end collar; and the at least two first end adjustable sliding bearings each having an end surface in contact with the outer surface of the main body to slide there along.

7. The control tube bearing assembly as recited in claim 2 wherein each of the at least one adjustable sliding bearings has a malleable material on a radially inward end thereof in contact with the outer surface of the main body.

8. The control tube bearing assembly as recited in claim 2 wherein:

each of the adjustable sliding bearings has a male threaded outer surface;

each of the first end collar and second end collar comprises female threaded void configured to each accept one adjustable sliding bearing; and wherein rotation of each of the adjustable sliding bearings within the associated threaded void radially prepositions said each of the adjustable sliding bearings relative to the outer surface of the main body.

* * * * *